Nov. 7, 1967  J. B. WEST  3,351,250
VALVE FOR VISCOUS FLUIDS

Filed Feb. 3, 1966  5 Sheets-Sheet 1

INVENTOR.
JOHN B. WEST

BY *Albert J. Kramer*

ATTORNEY

Nov. 7, 1967  J. B. WEST  3,351,250
VALVE FOR VISCOUS FLUIDS
Filed Feb. 3, 1966

INVENTOR
JOHN B. WEST

BY *Albert J. Kramer*

ATTORNEY

Nov. 7, 1967   J. B. WEST   3,351,250
VALVE FOR VISCOUS FLUIDS
Filed Feb. 3, 1966   5 Sheets-Sheet 3

INVENTOR
JOHN B. WEST
BY Albert J. Kramer
ATTORNEY

Nov. 7, 1967 J. B. WEST 3,351,250
VALVE FOR VISCOUS FLUIDS
Filed Feb. 5, 1966 5 Sheets-Sheet 4

INVENTOR
JOHN B. WEST
BY *Albert J. Kramer*
ATTORNEY

Nov. 7, 1967  J. B. WEST  3,351,250
VALVE FOR VISCOUS FLUIDS
Filed Feb. 3, 1966  5 Sheets-Sheet 5

INVENTOR
JOHN B. WEST

BY Albert J. Kramer
ATTORNEY

United States Patent Office 3,351,250
Patented Nov. 7, 1967

3,351,250
VALVE FOR VISCOUS FLUIDS
John B. West, Pikesville, Md., assignor to Maryland Cup Corporation, Owings Mills, Md., a corporation of Maryland
Filed Feb. 3, 1966, Ser. No. 524,673
9 Claims. (Cl. 222—532)

ABSTRACT OF THE DISCLOSURE

A valve for viscous fluids which prevents tailing has a body with an inlet and an outlet for the fluid. A single means is provided for opening and closing the inlet which generally comprises a sleeve having an opening on one side adapted to register with the inlet in one position, a piston reciprocating in the sleeve with an opening in the side to register with the sleeve opening and the inlet in the one position. The piston has a passageway extending through it from the opening to its lower outlet end. Means are provided for reciprocating the sleeve and piston relative to the body and relative to each other to open the inlet for communication with the outlet for a period in each cycle, then closing the inlet and while the inlet is closed move the piston relative to the sleeve to create a suction. This causes a partial withdrawal of fluid from the outlet to prevent tailing. Means are also provided for changing the relative movement of the parts to vary the quantities of fluid delivered on each cycle.

---

This invention relates to filling machines, and it is more particularly concerned with a machine for use in filling containers with viscous fluid materials, such as soft ice cream, oleomargarine, etc. which are conventionally prepared in bulk for packaging in containers that are sold in retail stores.

In packaging such materials, a problem arises when they are fed to containers by discharge through a nozzle connected to a source of supply. When the flow of the material through the nozzle is cut off at a fill station, a tailing is created by discharge of the material left in the nozzle. When the filled container moves to an adjacent station where a lid or other closure is to be applied to the container to complete the packaging operation, this tailing crosses the rim of the container and presents a sanitation problem in the operation of such packaging machines.

Accordingly, it is the general object of this invention to overcome this problem by providing a special acting valve through which the material is delivered to the container and which functions to eliminate this tailing problem.

A specific object of the invention is the provision of such a special acting valve which, after delivery of a predetermined amount of the fluid material to fill a container, provides a suction by means of which the material that would ordinarily form the tailing is held within the nozzle until a succeeding empty container is substituted for the filled container.

The term "tailing" is to be distinguished from "peaking," the latter being a small amount of material formed above the level of material in the container below the nozzle after the valve is cut off. Such mounds are readily flattened by the lid when it is placed on the container and does not, in small amounts, interfere with the placing of the lid on the container.

A further object is the provision of a valve of the type mentioned which is adapted as an auixliary attachment to a basic machine of the type disclosed in my prior U.S. Patent No. 3,225,889.

These and still further objects, advantages and features of the invention will appear more fully from the following description, considered together with the accompanying drawing:

Figure 1:
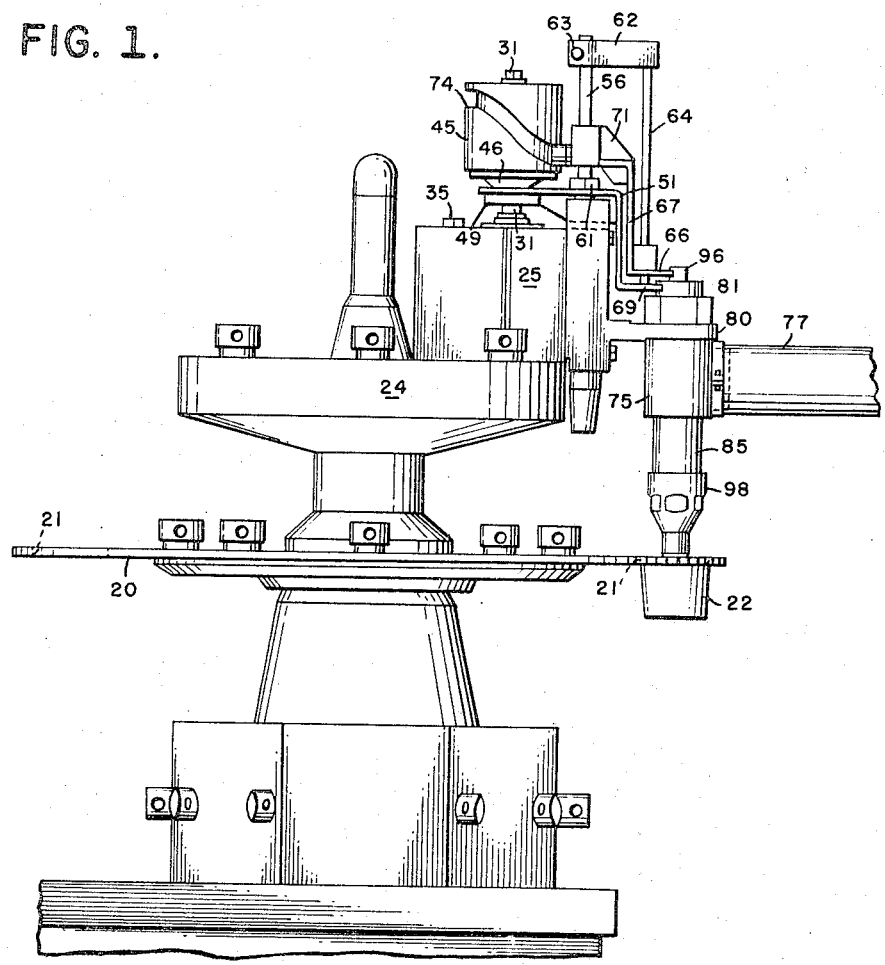
FIG. 1 is an elevational view of the upper portion of a machine as described in my prior U.S. Patent No. 3,225,889, with an embodiment of the present invention mounted thereon.
Figure 2:
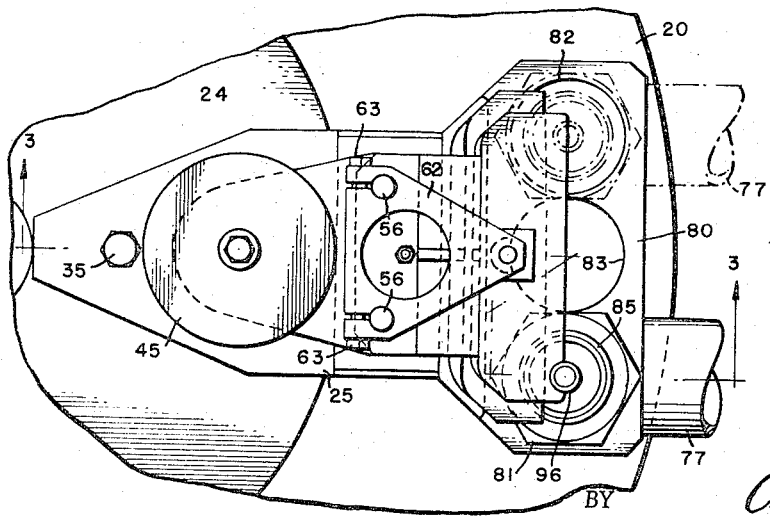
FIG. 2 is a top plan view of the embodiment of FIG. 1 on a larger scale with an adjacent fragmentary portion of the said machine.
Figure 3:
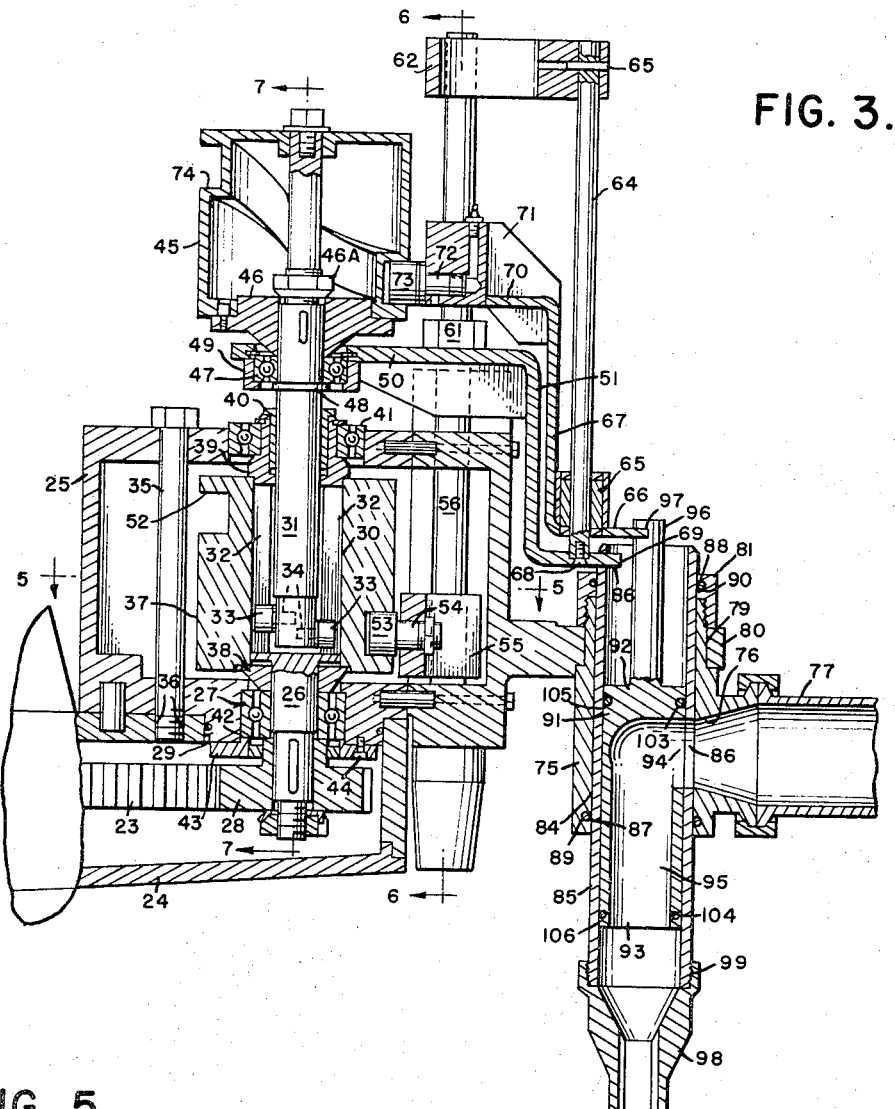
FIG. 3 is a vertical sectional view along the line 3—3 of FIG. 2, showing the embodiment at the beginning of its cycle of operation in the position of the valve where the viscous fluid can flow through its outlet nozzle.
Figure 5:
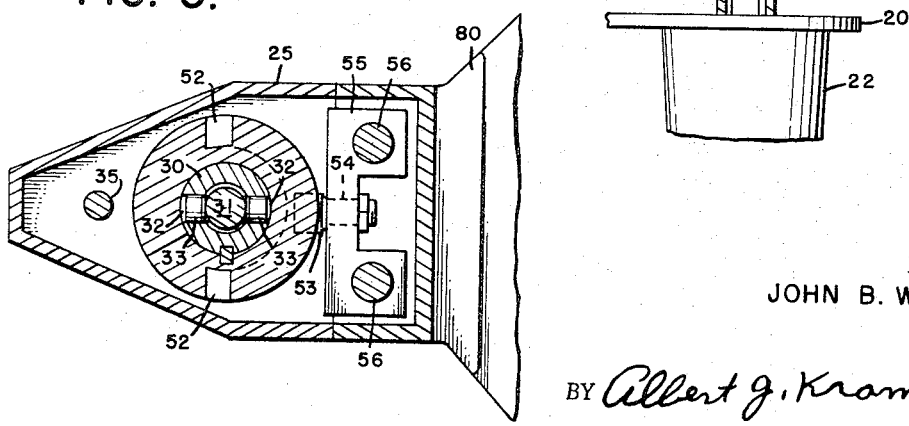
FIG. 5 is a cross sectional view along the line 5—5 of FIG. 3.
Figure 4:
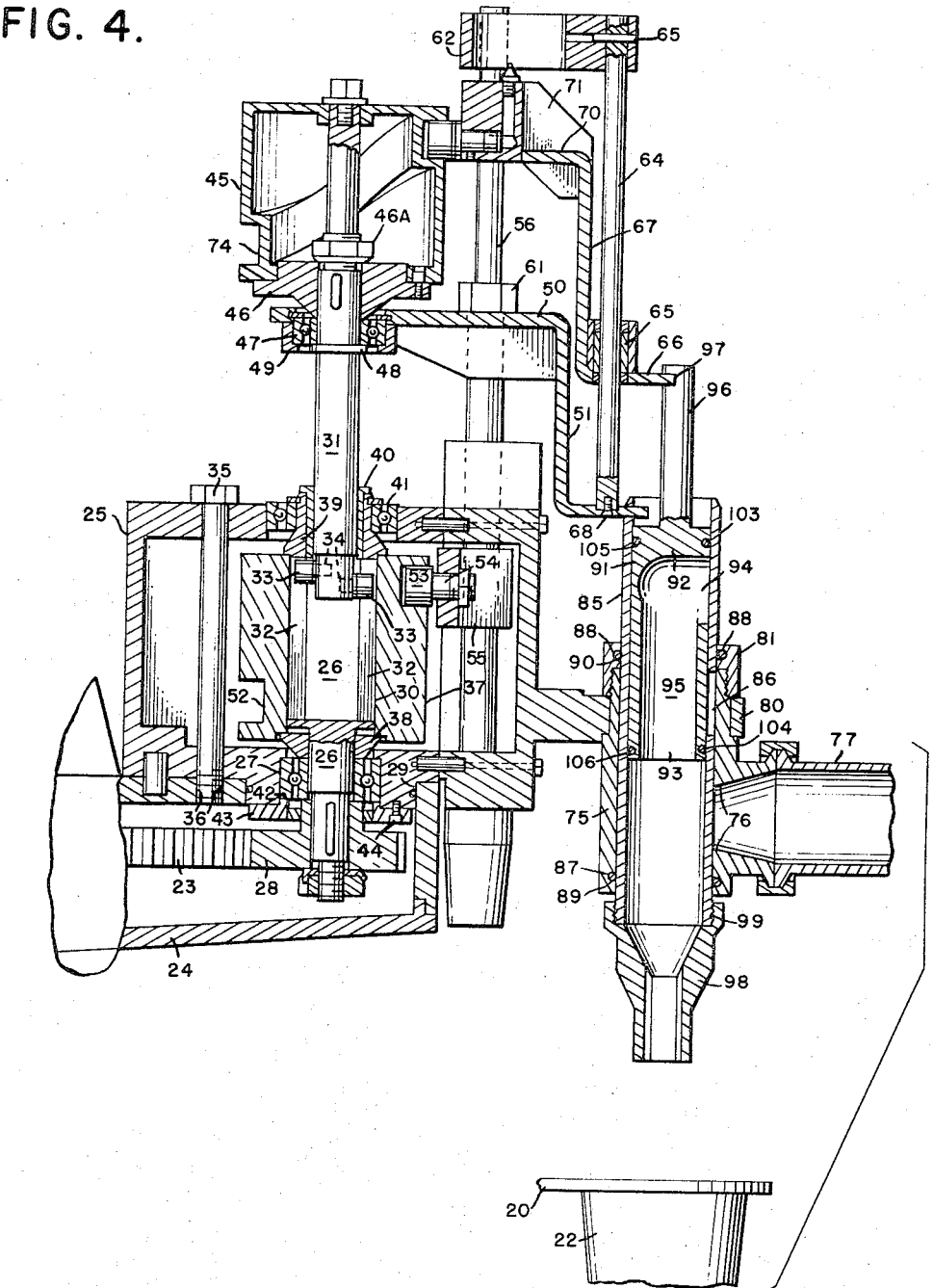
FIG. 4 is a view similar to FIG. 3 with the valve parts at the end of the cycle of operation when the flow of the material has been cut off and a countersuction created.
Figure 6:
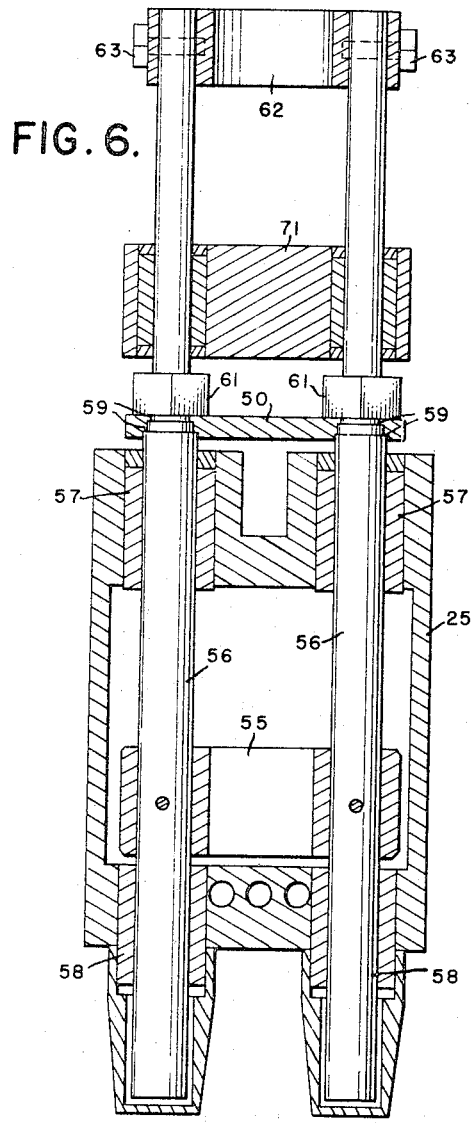
FIG. 6 is a vertical sectional view along the line 6—6 of FIG. 3.
Figure 7:
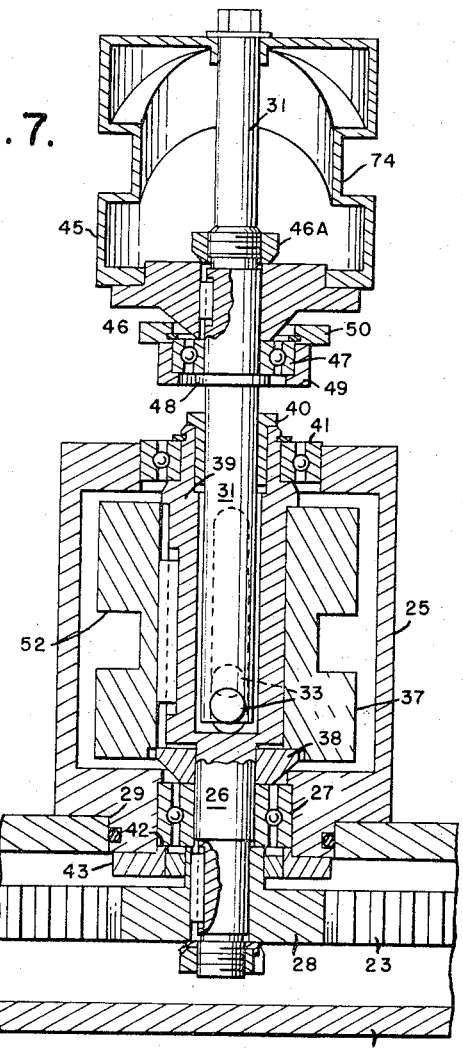
FIG. 7 is a vertical sectional view along the line 7—7 of FIG. 3.

Referring to the drawing with more particularity, the embodiment is illustrated in conjunction with a machine of the type described in my said prior Patent No. 3,225,889 to which reference is here made for a complete description.

In general, the machine comprises a horizontal loading wheel 20 provided with apertures 21 for holding the containers 22 of the open top type to be filled and closed at various stations defined by auxiliary units attached to the machine.

A driving gear 23 is contained in a housing 24 above the loading wheel 20. This housing is structurally capable of supporting various auxiliary units needed, including the embodiment of the present invention.

The embodiment illustrated in the drawing comprises a frame 25 which rotatably supports a vertical shaft 26 in a suitable thrust bearing 27. The lower end of the shaft 26 is keyed to a spur gear 28 which is adapted to pass through an opening 29 in the housing 24 and to be supported in meshed relation with the driving gear 23.

The upper end 30 of the shaft 26 is enlarged and hollow to receive the lower end of an inner coaxial shaft 31. A pair of diametrically opposite longitudinal slots 32, 32 are provided in the walls of the upper end 30 of the shaft 26, and a pair of driving rollers 33, 33 are slidably disposed in these slots, respectively, carried by their axles 34, 34 on the shaft 31.

A bolt 35 is disposed through the frame 25 and removably engaged with a threaded opening 36 in the housing 24. By these means, the device is firmly secured in position in relation to the driving gear 23.

A barrel cam 37 is mounted on and keyed to the enlarged upper end 30 for rotation therewith. The cam 37 is supported at the bottom by a spacer 38 on the thrust bearing 27. At the upper end of the cam an upper hub 39 which is an integral part of shaft 26 is held by a bearing 41 in an opening of the frame 25. The bearing 27 is supported in an opening at the bottom of the frame by an annular shoulder 42 of a bottom plate 43 secured in position by bolt 44. The bronze bearing 40 provides both axial and radial alignment for shaft 31.

The shaft 31 extends upwardly through the hub 39. At the upper end of the shaft 31 a second barrel cam 45 is mounted which comprises a bottom hub 46 keyed to the shaft 31 and secured in position by a nut 46A.

A thrust bearing 47 is disposed and supported on shaft flange 48 and in a bracket 49 of the upper horizontal part 50 of a connecting plate 51. The hub 46 has a flat bottom surface that rests on top of the inner race of the bearing 47.

The barrel cam 37 has a peripheral camming groove 52 that engages a cam groove follower in the form of a roller 53. The axle 54 of the roller 53 is attached to a bracket 55 pinned to a pair of reciprocating guide rods 56, 56. The rods 56, 56 are mounted for reciprocation in upper bearings 57, 57 and lower bearings 58, 58 in the frame structure 25.

The upper ends of the rods 56, 56 have a reduced diameter to provide upwardly facing annular shoulders 59, 59. The upper ends of these rods pass through apertures 60, 60 in the upper horizontal part 50 with the annular shoulders contacting the marginal edges of the part 50 adjacent the apertures 60, 60. By these means, the upward movement of the rods 56, 56 will carry with them the plate 51, the bearing 47 and the upper cam 45. The plate part 50 is held against the shoulders 59, 59 by nuts 61, 61.

The upper ends of the rods 56, 56 are connected to a triangular plate 62 by a clamping structure, including clamping bolts 63, 63. The apex of the triangular plate extends outwardly and is secured to the upper end of a connecting rod 64 by a pin 65. The rod 64 extends downwardly, passes through a slide bearing 65 and in the lower horizontal part 66 of a second connecting plate 67 and is secured by a bolt 68 to the lower horizontal part 69 of the connecting plate 51.

The plate 67 also comprises an upper horizontal part 70 which is connected to a bracket 71 slidably mounted on the upper part of the rods 56, 56. The axle 72 of a cam groove follower 73 is attached to the bracket 71. The groove follower 73 engages the camming groove 74 of the cam 45.

The valve itself comprises a hollow stationary member 75 having an inlet opening 76 on one side, and which opening is adapted to receive a fitting member 77 through which the filling material 78 is fed under pressure to the valve.

The member 75 is disposed in an opening 79 of a bracket extension 80 of the frame 25 and secured in position by a nut 81.

An additional opening 82 in the bracket 80, similar to the opening 79, is provided for a member identical to the member 75 when it is desired to use the device for simultaneous filling of two containers at once such as shown in U.S. Patent No. 3,225,889 referred to above. However, when only one container is to be filled at a time, a third opening 83 between the openings 79 and 82 is provided for a single valve instead of the two.

The member 75 has a vertical opening 84 therethrough extending from top to bottom. Within this vertical opening there is slidably disposed a cylindrical sleeve 85 which has an opening 86 on the side adapted to register with the opening 76.

The sleeve 85 is connected to the lower horizontal part 69 of the connecting plate 51 for movement therewith. The end of the plate part 69 engages a slot 86 at the upper end of the sleeve.

O ring seals 87 and 88 in recesses 89 and 90, respectively, of the member 75 and nut 81 contact the outer surfaces of the sleeve 85 to prevent discharge of fluid between the sleeve and member 75.

On the interior of the sleeve 85 there is disposed for reciprocation relative thereto a piston 91. This piston has a closed upper end wall 92 below which it is hollow, the lower end 93 being open. A side opening 94 is also provided similar to the opening 86 and adapted to register therewith. The hollow portion between the side opening 94 and the open lower end 93 constitutes a passageway 95 for the transfer of fluid from the inlet opening 76. O ring seals 103 and 104 in grooves 105 and 106 of the piston 95 contact the inner surface of sleeve 85 to prevent leakage.

Projecting upwardly from and integral with the wall 92 is a shaft 96 by means of which the piston 91 is reciprocated. This shaft 96 is connected to the guide rods 56, 56 by means of the plate 67. The lower horizontal part 66 of the plate is adapted to engage a slot 97 in the upper end of the shaft 96.

The valve outlet comprises a threaded nozzle 98 removably connected to the threaded lower end of the sleeve 85.

The rotation of the spur gear 28 by the driving gear 23 causes the shafts 26 and 31 to rotate which in turn causes rotation of the cams 37 and 45.

Rotation of the lower cam 37 causes its groove follower 53 to reciprocate vertically within the limitations of the groove 52. This causes the guide rods 56, 56 also to reciprocate correspondingly and thereby elevate and lower, cyclicly, the plate 57 and the parts attached thereto including the upper cam 45 and the sleeve 85. At the same time, however, the upper groove follower 73 is also being reciprocated by (1) rotation of the upper cam 45, and (2) by the vertical movement imparted to this cam by movement of the plate 51 through motion of the lower groove follower 53.

Figure 13:
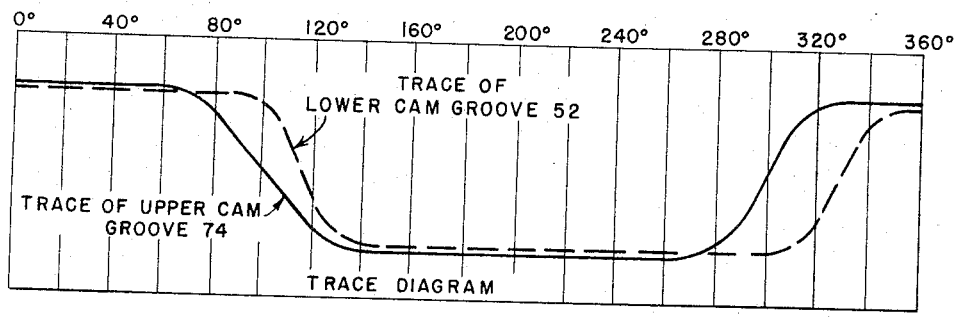
FIG. 13 is a diagram of the trace of the two cam grooves superposed to illustrate their relative aspects during a complete cycle of operation.

The cam grooves are not identical to each other in contour but vary as shown in FIG. 13 so as to cause the upper follower to lead the lower follower in their movements substantially by the amounts shown in the diagram.

Figure 10:
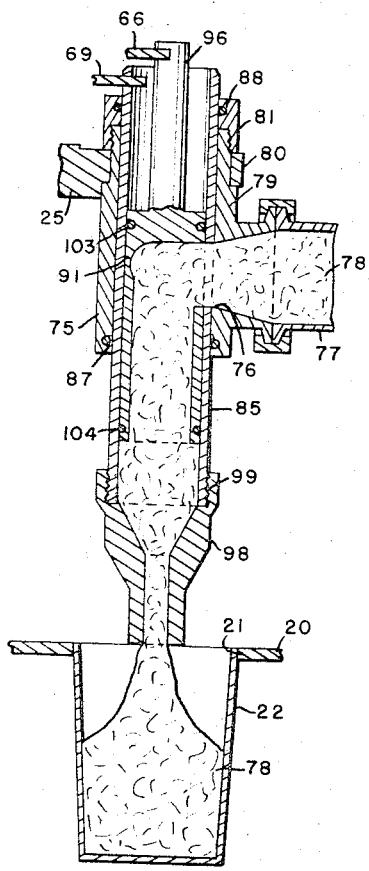
FIGS. 10, 11 and 12 are three sequential fragmentary views, in section, of the essential valve parts illustrating the principle of operation during a cycle of the operation.
Figure 11:
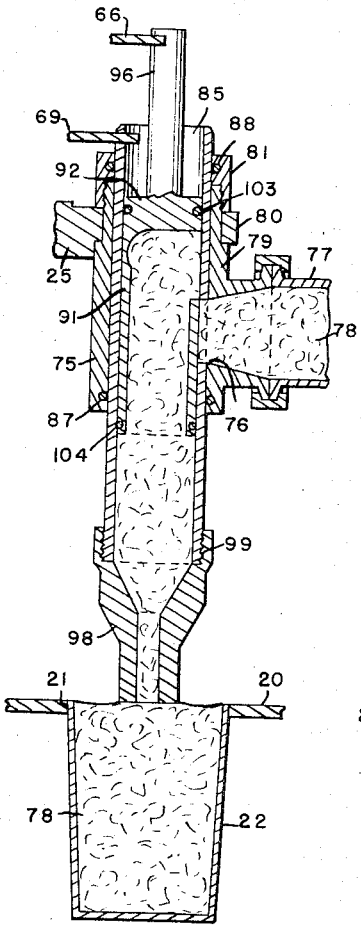

This relationship causes the piston 91 to move from an initial position (see FIG. 10) upwardly to a position where the inlet opening 76 is closed. (See FIG. 11.) From this point the piston moves farther upward relative to the sleeve 85 to create a partial vacuum above the fluid 78 remaining in the valve. This partial vacuum creates a back pressure after flow through the valve is cut off, thereby preventing the objectional tailing produced by conventional fluid valves, and occurs simultaneously with the raising of sleeve 85 and nozzle 98.

The nozzle 98 is raised while the loading wheel 20 is rotated to move the filled container from a position directly beneath the nozzle 98 to a capping station (not shown). At the same time a fresh empty container on the loading wheel moves into position below the nozzle in preparation for the next cycle of operation, whereupon the sleeve 85 is lowered with the piston to return the system to the relative positions of the members shown in FIG. 10.

Figures 8, 9:
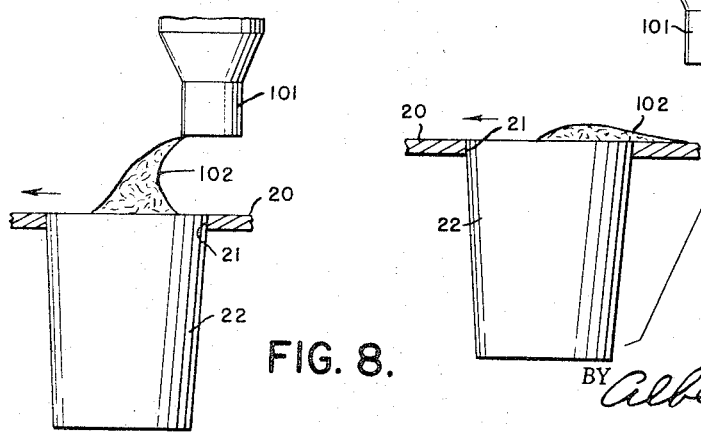
FIGS. 8 and 9 are sequential schematic views illustrating the effects of "tailing" in the operation of conventional valves.
Figure 12:
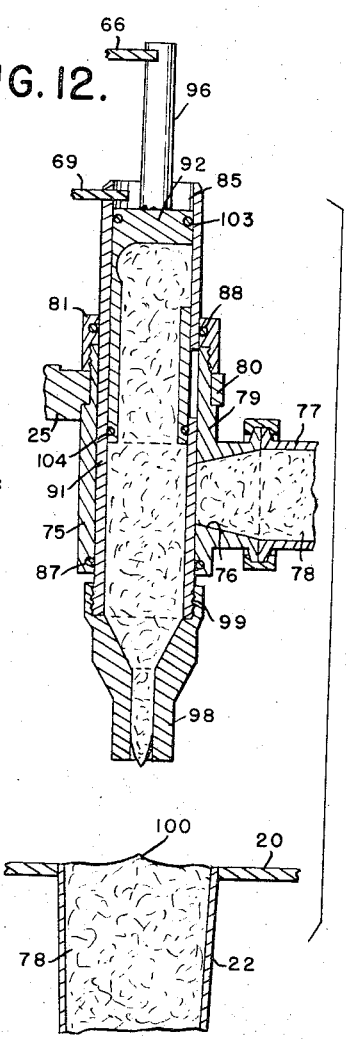

By virtue of this action, there is left only a small "peak" 100 on top of the fluid material placed in the container 22 (see FIG. 12) which is easily flattened by a conventional lid (not shown) placed over the mouth of the container. This is in sharp contrast to the action of a conventional valve 101 as illustrated in FIGS. 8 and 9 which results in the production of a tailing 102 after the valve is cut off and which is pulled away from the nozzle when the container moves to the lidding station to fall over the rim of the container as shown in FIG. 9.

What is claimed is:

1. A valve for dispensing a highly viscous fluid material comprising a member having an inlet and an outlet for the material, a single means for opening and closing the inlet to permit the passage of a predetermined quantity of the fluid and for creating a suction against the fluid in the member after the inlet is closed to prevent discharge of excess amounts of fluid from the outlet, said means comprises a sleeve mounted for reciprocation in the passageway, said sleeve having an opening on one side adopted to register with said inlet in one position of its movement relative thereto, a piston mounted for reciprocation in said sleeve, said piston having an opening in the side thereof adapted to register with the said opening and sleeve in one position of its movement relative to the sleeve, said piston having a passageway extending through it from its said opening to its lower end, the lower end of said sleeve comprising an outlet apart from said inlet for material introduced through the inlet, sealing means between the piston and sleeve, and means for cyclicly reciprocating the sleeve and piston relative to the body and relative to each other so as to open the inlet for communication with the outlet for a period in each cycle of operation, then closing the inlet and, while the inlet is closed, move the piston upward relative to the sleeve to create a suction against the fluid material above the outlet.

2. A valve as defined by claim 1 in which the outlet comprises a discharge nozzle and means for cyclicly elevating and lowering said nozzle in relation to a container to be filled in a position therebelow.

3. A valve for dispensing highly viscous material comprising a valve body in the form of a hollow cylindrical member having an inlet opening on one side and an outlet opening at the bottom, a cylindrical sleeve mounted for reciprocation in said outlet opening, a nozzle connected to the bottom of the sleeve, a hollow piston slidably mounted in the upper part of the sleeve, said piston and sleeve having side openings adopted to register with each other and with said inlet opening in the open position of the valve, and means for cyclicly reciprocating the piston between open and closed positions of the valve and for reciprocating the sleeve to elevate and lower the nozzle.

4. A valve as defined by claim 3 in which the means for cyclicly reciprocating the piston comprises a first cam follower connected to the piston and a first cam for actuating the cam follower.

5. A valve as defined by claim 4 in which the means for cyclicly raising and lowering the sleeve comprises a second cam follower connected to the sleeve and a second cam for actuating the second cam follower.

6. A valve as defined by claim 5 in which the cams are independently mounted, respectively, on separate telescopable shafts, means for rotating said shafts simultaneously, means for connecting the second cam follower to the shaft of the first cam, whereby movement of said second cam follower will cause the cams to move axially relative to each other.

7. A valve as defined by claim 5 in which the cams are rotatably mounted each on a separate shaft, said shafts being mounted for axial movement relative to each other, means for rotating said shafts simultaneously, means connecting the second cam follower to the shaft of the first cam whereby movement of said second cam follower will cause the shafts to move axially relative to each other.

8. A valve as defined by claim 7 in which the cams are barrel cams, each cam having a continuous peripheral groove defining the path of movement of the respective cam followers, said cam followers being slidably engaged with said grooves.

9. A valve as defined by claim 8 in which the grooves are adapted to cause one cam follower to move in relation to the other cam follower so as to cause an expansion of the space in the valve continuous with the outlet after the inlet is closed to create a suction against fluid material in the space in an amount sufficient to prevent tailing.

References Cited

UNITED STATES PATENTS

| | | | |
|---|---|---|---|
| 650,176 | 5/1900 | Holmes | 141—116 X |
| 2,150,760 | 3/1939 | Cozzoli | 141—116 X |
| 2,721,008 | 10/1955 | Morgan | 141—117 X |
| 3,038,507 | 6/1962 | Smith | 141—117 |
| 3,146,282 | 8/1964 | Ninneman | 141—116 X |

ROVERT B. REEVES, *Primary Examiner.*

HADD S. LANE, *Examiner.*